United States Patent [19]
Bull et al.

[11] Patent Number: 6,065,118
[45] Date of Patent: *May 16, 2000

[54] MOBILE CODE ISOLATION CAGE

[75] Inventors: John Albert Bull, Northants; David John Otway, Cambridge, both of United Kingdom

[73] Assignee: Citrix Systems, Inc., Fort Lauderdale, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/718,874

[22] Filed: Sep. 24, 1996

[30] Foreign Application Priority Data

Aug. 9, 1996 [GB] United Kingdom .................... 9616783

[51] Int. Cl.[7] .............................. G06F 11/30; H04L 9/00; H04L 9/32
[52] U.S. Cl. ................................ 713/200; 713/201; 380/4
[58] Field of Search ............................... 395/186, 187.01, 395/188.01, 704; 380/4, 23, 25; 713/200, 201, 202; 709/218, 223, 224, 225, 231, 250

[56] References Cited

U.S. PATENT DOCUMENTS

| 5,412,717 | 5/1995 | Fischer ......................................... 380/4 |
| 5,668,999 | 9/1997 | Gosling .................................... 395/704 |

FOREIGN PATENT DOCUMENTS

| 0 658 848 A2 | 10/1994 | European Pat. Off. ........ G06F 12/14 |
| 2 136 171 | 9/1984 | United Kingdom ............. G11C 8/00 |
| WO 97/12321 | 4/1997 | WIPO ............................. G06F 11/00 |

OTHER PUBLICATIONS

Jan Vitek et al., "Mobile Object Systems Towards the Programmable Internet", Second International Workshop, MOS'96, pp. 177–199.

Drew Dean et al., "Java Security: From HotJava to Netscape and Beyond", Department of Computer Science, Princeton University, Princeton, New Jersey, Jun. 5, 1996, pp. 190–200.

Marshall D. Abrams et al., "Trusted System Concepts", Computers & Security, vol. 14, No. 1, 1995. pp. 45–56.

Francois Rouaix, "A Web navigator with applets in Caml", Computer Networks and ISDN Systems, 1996, pp. 1365–1371.

*Primary Examiner*—Dieu-Minh T. Le
*Attorney, Agent, or Firm*—Testa, Hurwitz & Thibeault, LLP

[57] ABSTRACT

The present invention reduces the risk of damage to data or programs in an end user computer system programmed to operate in response to an imported data stream containing one or more mobile program components from an external source. The incoming data stream is screened to identify mobile program components of that data stream. Some of the mobile program components are passed to a program execution location isolated from the end user system prior to being executed to operate in a desired manner. The execution location has an interface with the external source of the data stream and an interface with the end user system. The operation of the interface between the execution location and the end user system is programmed so that only data which has been interacted on by the program component within the execution location in a specified and controlled manner can be passed to and from the end user system.

14 Claims, 4 Drawing Sheets

PROPOSED STRUCTURE

CURRENT STRUCTURE

PROPOSED STRUCTURE

MOBILE CODE ISOLATION CAGE

The present invention relates to a method and apparatus, notably to a method for reducing the risk of corruption or damage to data or programs held in an end user network of computer systems by mobile program components imported into that system from an external source and to a computer system programmed or modified to operate using the method of the invention.

BACKGROUND TO THE INVENTION

The user of a stand alone or networked computer system, both hereinafter collectively called an end user system, often has a need to import data or whole programs or parts of programs, hereinafter collectively and individually called program components, from an external source to enable the end user system to operate in a desired manner. The term program component is used herein to denote material which is interpreted by a computer system to operate the system in a specific manner, whereas data is the information material upon which the computer system acts under the direction of the program components.

Users, particularly banks and other financial institutions, need to be able to inspect incoming program components and data to ensure that they will not corrupt or otherwise adversely affect the data and operating programs held in their systems. This is particularly important where there area number of computer systems operating within a network and in which the network or computer systems within that network have a number of points at which access to external data and program sources can be made.

Where the system is a closed network and the data or program components are provided from other units within the same network, the user can satisfy himself that the data and program components do not contain material which could adversely interact with the data and programs held on his particular unit of the network. Such satisfaction will typically involve the inspection of the computer listings upon which the program is based to ensure that there are no errors or adverse components within the program. However, where the program or program component being imported is large and complex, such inspection and verification becomes excessively time consuming and expensive and therefore impractical.

Where the end user network or stand alone system is to receive data or program components from a source which is external to the network, for example from the Internet or an external data base, the risk of deliberate or accidental introduction of program components which can adversely interact with the data or programs already held in that end user system is increased. Since the external data source may be operating under one or more large and complex programs, which are themselves under continual updating and revision, it is effectively impossible to inspect each program and every modification of the program to ascertain that the end user system will not import adversely acting material.

There are a number of forms of program components which can cause corruption or damage to data or programs held in an end user system and/or can cause other deleterious effects when imported into the end user system. Such program components include those which are deliberately designed to corrupt the data or operating programs of the end user system; those which collect confidential data from the end user system and transmit that data to an external location without the end user being aware that such unauthorised transmission or theft of data is taking place; and programs which deny the user full and proper use of the end user system, for example by introducing repeating closed loop operations which consume the computing capacity of the end user system or deny access to areas of the end user system. Such program components are known as viruses, zappers, hostile Applets, Trojan Horses and service deniers and will be generically denoted as viruses hereinafter. A widespread concern is the deliberate distribution of such virus programs or program components into an end user system where they are executed and adversely interact with or cause disruption to the proper operation of the system. Whilst an end user can repeatedly inspect data and programs within a closed network to detect such viruses, the end user cannot inspect the external data or program source for such viruses and must accept the risk that any import of data or program components from an external source may import viruses into his system.

In order to reduce the risk of importing material from an external source which could adversely interact with an end user system, it is commonplace to screen all incoming data and programs or program components to identify the source of that material. Only material from specified sources is permitted access into the end user system. The end user can satisfy himself that such sources provide known quality of data and/or programs which have been inspected. Alternatively, the user can base his confidence in the source of material on its reputation for accuracy in compiling programs and for reducing the presence of possible adversely acting program components in any program components it makes available to end users. Such screens are known in the computer field as firewalls and act uni-directionally on a communications hardware level to allow incoming material to pass if it comes from a specified communication address or to destroy incoming material if it does not come from a specified source.

However, a firewall prevents access by the operator of an end user system to data and programs which are from non-specified sources. This restricts the freedom of the user to access alternative sources until they have been inspected and authorised. Furthermore, where the external source is operating under a large or complex program, such inspection is not practical and any authorization of access to that external source may destroy the integrity of the end user system.

These problems are aggravated where there are many points in the end user system from which external sources of data and programs can be accessed. It has been proposed to limit the number of such access points in an end user system and to ensure that all incoming material is fully screened at the permitted access points. However, this can lead to excessive bottle necks in the operation of the system and delays in accessing the external source from any given end user computer system in a network.

It is also common place to provide one or more virus detection programs within an end user system. These operate by recognising characteristic patterns in the virus program and destroying the virus program before it is executed within the end user system. The detection program may also recognise specific sites in an operating program to which a virus may attach and remain dormant until executed and thus detect when a virus is present by a change in such a site. However, this requires the detection program to recognise specific features or patterns and requires that the virus be imported into the end user system before it can be identified and neutralised. Furthermore, where the virus is one which is not recognised by the virus detection program, for example because it is a new virus or a mutation of an existing one, the virus may not be detected and may be executed within the end user system.

In many applications it is desirable to include program components within a stream of data from an external source to enable the end user system to handle that data effectively. For example, many data sources written in the JAVA language utilise mobile program components, or Applets, in the data stream transmitted to an end user system to enable the end user system to handle data more effectively, for example to create images upon the end user system video screen from data already held at the end user system. This avoids the need to transmit the data for each image from the external source and thus speeds up the operation of the end user system.

Such program components are termed mobile since they are intended to be imported into the end user system and to be executed within that system and to interact in a beneficial manner with the data and program components held at the end user system. It is therefore necessary that they should be accepted by the end user system. They therefore pass through any firewall and are not rejected or destroyed by a virus detection program. It has been proposed to sign and seal such program components cryptographically so as to identify the program component as coming from an authorised source, for example one where the components have been individually inspected. However, this requires the end user to place complete trust in the integrity and competence of the organisation cryptographically signing and sealing the program components they export.

Where the program or program component imported from the external source is large and complex and/or is constantly being updated, as is the case with network browser programs, it is not possible to provide a high level of confidence in such programs or program components. This may present an acceptable risk to the operator of the end user system when balanced against the advantages that the use of such program components gives.

However, it is possible that such mobile program components, whilst satisfying the authentification or identified source criteria, can be interpreted incorrectly in the end user system and/or can deliberately or accidentally interact adversely with the data and/or program components already held by the end user system. This raises a problem for the end user operator. On the one hand, the importation of the mobile program components is desirable for the proper operation of the end user system; but they can cause corruption of data and damage to the operating and other programs held by the end user system. The conventional firewall or virus detection programs cannot protect the end user system without preventing proper operation of the system.

The problem of deliberate or accidental errant interaction of desirable mobile program components from an external source has been recognised as a major problem by the computer industry, but no effective solution has yet been proposed.

We have now devised a method and apparatus by which an end user system can be protected from the errant effects of such otherwise desirable mobile program components imported from an external source.

SUMMARY OF THE INVENTION

Accordingly, the present invention provides an end user computer system programmed to operate in response to an imported data stream containing one or more mobile program components from an external source, characterised in that:

a. the incoming data stream is screened to identify mobile program components of that data stream;

b. some or all of the mobile program components are passed to one or more program execution locations selectively isolated from or within the end user system prior to being executed to operate in a desired manner;

c. the execution location is one in which one or more program components are retained and which has one or more interfaces with the external source of the data stream and one or more interfaces with the end user system whereby program component(s) within the execution location can be executed within the execution location to interact with the external source of data and/or the data and/or a program held by the end user system; and d. the operation of the interface(s) between the execution location and the end user system are programmed so that only data which has been interacted on by the program component(s) within the execution location in a specified and controlled manner and/or program components which operate in a specified manner can be passed to and from the end user system.

In the present invention the execution location will be located upon the same physical site as part or all of the end user system, for example associated with an access gateway to the end user system, which may itself be located remotely from the downstream remainder of the end user system. However, the execution location need not be located within the end user system itself, but can be located as a protective isolation screen between the external source of the data and program components and the downstream end user system. For convenience, the term within the end user system will be used herein to denote the case where the execution location is provided within one or more of the computer units of the end user system; and the term external to the end user system will be used to denote a computer unit or other means which, whilst located on the same geographic site as the end user system, is isolated from the end user system and in which program components can be executed in selective isolation from the end user system.

By providing the execution location, incoming mobile program components are contained selectively isolated from or within the end user system. Although the program components may operate errantly within the execution location, they are only permitted to interact with the end user system in a specified and controlled manner. Since the program operating the execution location can be comparatively small, the end user can inspect the program listing for that program to ensure that it fulfils the desired criteria. The operator can thus have a high level of confidence that only data which has been processed in a specified desired manner or a program component which operates in a desired manner can be transmitted from the execution location to the end user system. The operating program can also prevent the passage of program components to the end user system from the execution location, thus minimising the risk of viruses or undesirable program components from entering the end user system. In addition, the execution location can operate to limit access of a program component from the execution location to specified resources within the end user system, for example to limit access time to the central processor to minimise the effect of a services denial virus, to limit the bandwidth of the communications access, to limit access to certain disc blocks in the hard disc memory.

The program operating the execution location can be selectively written so as to permit transmission or reception of data only to or from specific sources within the end user system and/or a specific external source, so that imported program components executed in the execution location cannot access certain areas of the data base in the end user system. For example, an execution location could be programmed only to operate on purchase ledger data, another could be programmed to operate only on personnel data. It may therefore be necessary to provide a series of execution locations, each designed to operate in an individual manner on specified data sources and destinations. This will enable the operating program for each execution location to be smaller and more specific and hence easier to inspect and verify.

For convenience, the invention will be described hereinafter in terms of an execution location programmed to operate with a single external source or destination of data external to the end user system and to transmit or receive data to or from a single destination within the end user system. However, it will be appreciated that the invention can be applied to execution locations operating with a plurality of external and/or end user sources and destinations in any combination.

The execution location is selectively isolated from or within the end user system, that is the execution location can only receive and transmit data and/or program components in a selective and controlled manner via the interfaces with the external source and the end user system. Thus, the execution location will typically require a level of intelligence and data storage so that it can accept and store the incoming mobile program components from the external source and can then execute those program components under the control of an operating program already held within the execution location to interact with data from the external source and/or from the end user system. If desired, the operating program required for the execution location can be held within the end user system to minimise corruption from external sources, and is transmitted to the execution location as part of the start up procedure of the end user system. As explained below, several operating programs may be available to the execution location depending upon the type of data it is to handle and the type of operation to be carried out on that data. The end user or system administrator may be provided with means, for example specific keyboard operations, which load the appropriate operating program to the execution location where a selection has to be made between various alternatives.

The requisite processing and data storage functions for the execution location can be provided by one of the computer units within the end user system network or as an isolated portion of one of the computer units, so that the execution location is located within the end user system. However, with current computer architecture it may not be possible to provide a sufficiently isolated environment in which the program components are executed. It is therefore preferred to provide the execution location as a separate physical unit selectively isolated from the end user system with which it is to interact and to provide limited access routes between the execution unit and the end user system which are operated under the control of the program operating the execution location unit. Typically, the execution unit will be a conventional computer having its own processor and memory capability.

For convenience, the invention will be described hereinafter in terms of a separate computer acting as an execution location which is physically separate from the end user system, but which is configured as if it were a data import access point to the end user system network.

Whilst the execution location will preferably transmit only data to and from the rest of the end user system, it may be programmed to permit transmission of program components to the end user system. Since such program units will have been subjected to inspection within the execution location by a program which the end user has inspected or in which he has a high level of confidence, the risk that such transmitted program components will operate errantly within the end user system is minimised. The execution location can thus be used to inspect and verify incoming program components which it is desired to download into the end user system and can be used to intercept virus programs before they reach the end user system. However, it may be that the end user is confident that specified program components are acceptable, in which case they may not need to be inspected within the execution location but may be passed directly to the end user system. However, it will usually be preferred to pass all computer components within an incoming data stream to the execution location.

For convenience, the invention will be described hereinafter in terms of the transmission solely of data to the end user system.

As stated above, the execution location transfers data between the execution location and the end user system only if it complies to predetermined criteria so that the execution location regulates the exchange of data to and from the end user system and the execution location. The operating program required to achieve this and to identify program components in the data stream from the external source can be written using conventional programming techniques having regard to the source and destination within the end user system required for the initial data and the resultant processed data.

As stated above, a single execution location can be used to achieve a specified operation upon specified data. However, it is within the scope of the present invention to provide an execution location which can operate upon several categories of information and/or with data from several sources and/or destinations of information. This may require separate operating programs for the execution location to run concurrently or consecutively. Alternatively, separate execution locations can be provided, each to achieve a specific operation upon specific data. It will also be appreciated that one or more execution locations can be provided at each point at which the end user system accesses an external data source and that each such access point can have an execution location which is to operate in a specific manner upon specific data. The operator of the end user system can thus identify the function and potential sources to be accessed at each access point by selection of the operating program under which the execution location at that access point operates. This will further regulate the importation of material from external sources to the end user system. It is also within the scope of the present invention to create zones within a system into which access from other zones of the same system or network is regulated by providing execution locations of the invention at the access points between the zones of the system.

Whilst the execution location of the invention may provide the sole regulation of importation of material into an end user system from an external source, it is preferred to locate the execution location between two firewalls which inhibit transmission of undesirable program components and/or data from the external source and/or the end user system. Such firewalls can be of conventional form and serve to reduce the load imposed upon the execution location by providing primary control of the flow of material to and from the end user system.

The invention is of especial application to data sources operating under JAVA technology which utilises mobile program components or Applets which are executed by the end user system to customise the application program under which data is to be processed to suit the end user system and to set up the end user system for the receipt of data from the external source. However, the invention is applicable to the interception and storage in the execution location of program components from other technologies and computer languages. As indicated above, the execution location can also be used to intercept viruses before they reach the end user system. Where a program component within an execution location has operated in an undesirable manner, the results of that errant operation are retained within the execution location and are not allowed to be transmitted to the end user system or the external source. The detection of an errant operation within the execution location can cause the execution location to close down and re-initialise so as to delete and re-instate all data and program components within the execution location. If desired, the program component causing the errant operation can be identified for audit purposes to identify the source of the program component so that the end user can investigate the integrity of the source and take appropriate action regarding importation of further data from that source. The deletion of material from the execution location and re-initialisation or other subsequent operations can be carried out using conventional programming techniques.

The invention has been described above in terms of an end user system receiving data from an external system which is accessed by a number of other users, that is a public access system or service provider. However, the invention can also be applied to the public access service provider so as to protect the public access data base from corruption by importation of undesirable program components, for example viruses. In this case, the execution location is provided at some or all of the access points to the service provider in a similar manner to that described above for the end user system.

The invention thus also provides a method for operating an end user computer system which comprises importing to the system a data stream containing one or more mobile program components which it is desired to execute on the computer system from an external source, which method comprises:

a. screening the incoming data stream to identify mobile program components of that data stream;
  b. passing some or all of the mobile program components to one or more program execution locations selectively isolated from or within the end user system;
  c. executing the mobile program component within the execution location so as to interact with data from the end user system and/or from the external source;
  d. passing program components which operate in a specified manner and/or the interacted data or the resultant data from such interaction to the end user system via an interface which permits the transmission of data and/or program components which correspond to specified criteria to or from specified locations in the end user system and/or in the external source.

DESCRIPTION OF THE DRAWINGS

The foregoing and other objects, features and advantages of the present invention, as well as the invention itself, will be more fully understood from the following description of preferred embodiments, when read together with the accompanying drawings, in which.

DESCRIPTION OF THE PRESENT SYSTEM

Figure 1:
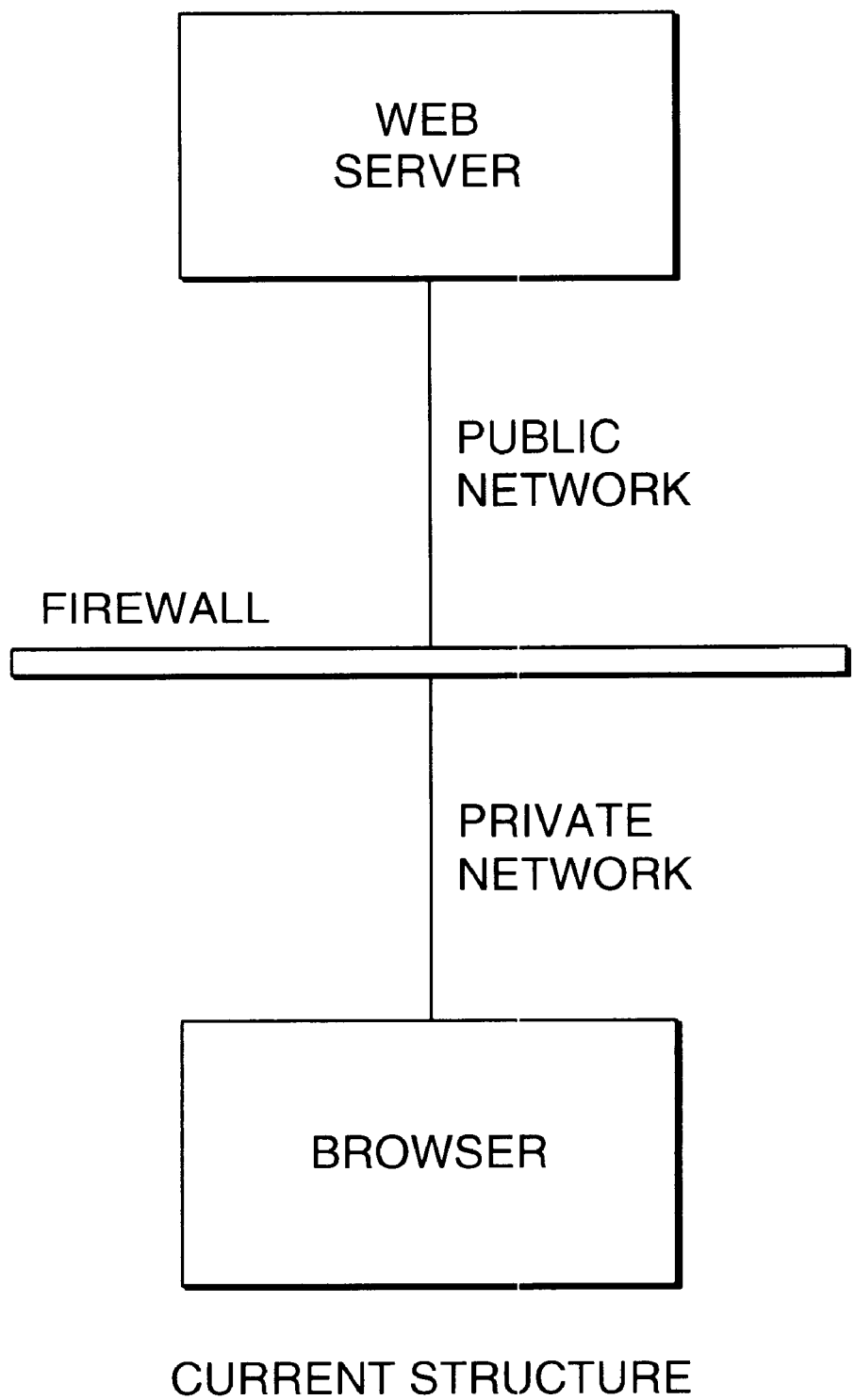
FIG. 1 is a block diagram of a computer network depicting the interconnection of an end user system to a public network, as known in the prior art.

FIG. 1 shows a current system for importing data and/or program components from an external source, for example data from a Web server, and comprises a single computer unit or a plurality of computer units in an end user computer system interconnected by a private network, and the Web server connected to the public network. The end user uses a browser or other program held on the end user system to identify the data and/or program components which are to be imported from the Web server. The browser program may be held on any or all of the computer units in the end user network. In order to reduce the risk of importing undesirable material, the access point to the end user system is provided with a firewall which only allows the passage of data and program components from the public network which come from or go to specified addresses in the public network. The browser and/or firewall may also refuse to import program components or data that has not been cryptographically signed and sealed by a known and/or trusted source. It is also customary to hold a virus detection program on the end user system which detects the characteristic patterns of known viruses or changes which such viruses make in programs carried by the end user system.

However, where the data stream from the public network contains mobile program components which it is desirable to execute on the end user system, problems arise in ensuring that the imported material does not contain material which could operate incorrectly or maliciously on the end user system. The firewall will allow such program components to pass since they come from an accepted address and whilst it may have a measure of intelligence operates by identification of the communication address from or to which the data and program components are transmitted. The virus detection program cannot guarantee to detect and de-activate the program components when they operate incorrectly since they may not be recognised as detrimental viruses. As a result, the end user system is vulnerable to importation of errant program components.

Figure 2:
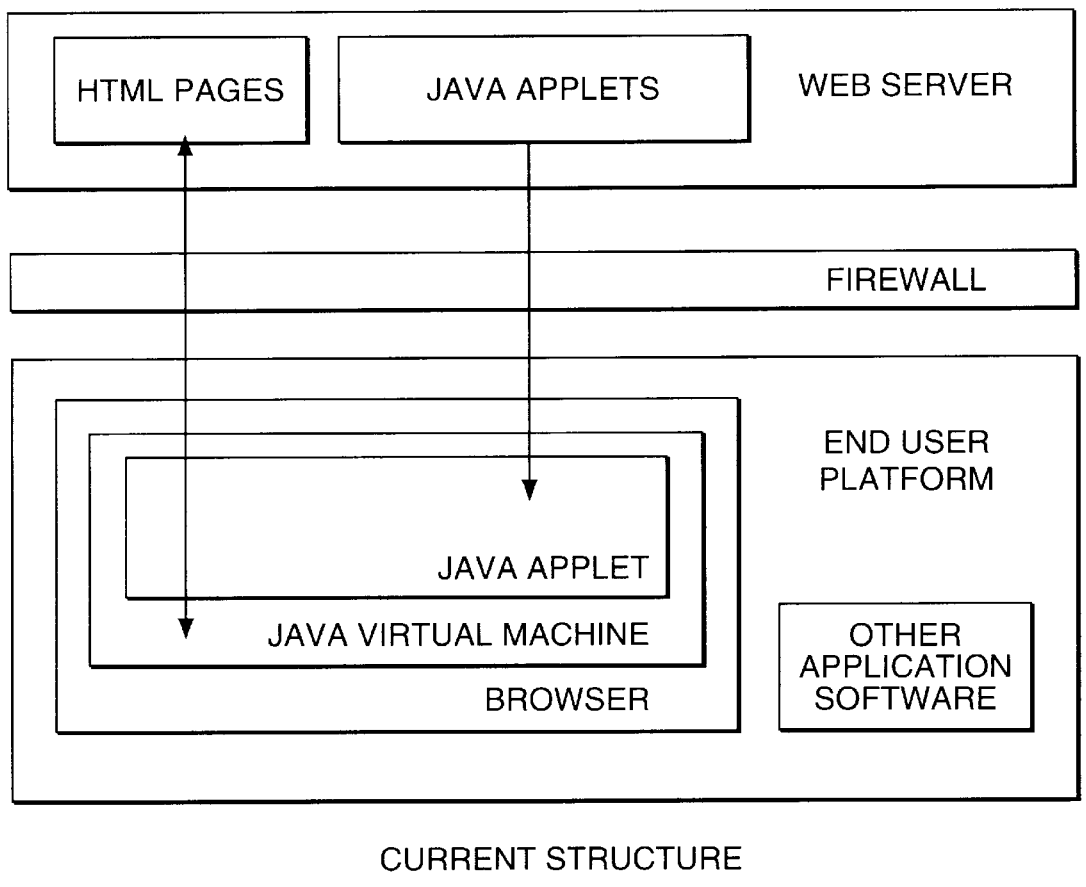
FIG. 2 is a block diagram of a computer network depicting transmission of the mobile program components across the computer network, as known in the prior art.

Such a problems exists specifically with systems operating using JAVA technology as exemplified by that shown in FIG. 2. The end user, identified as the host platform, carries a browser program which is used to request data from a service provider. This is provided via the network server which transmits a stream of data containing JAVA Applets, which the end user desires to run on the end user system. The JAVA Applets are executed on the end user system via a JAVA Virtual Machine which maintains the interfaces to the end user system via the browser program and to the Web server. However, the browser may incorrectly interpret the Applets or the Applets may accidentally or deliberately contain harmful instructions. At present there is inadequate protection for the end user system from such errant interpretation or harmful instructions.

DESCRIPTION OF THE PREFERRED EMBODIMENT

Figure 3:
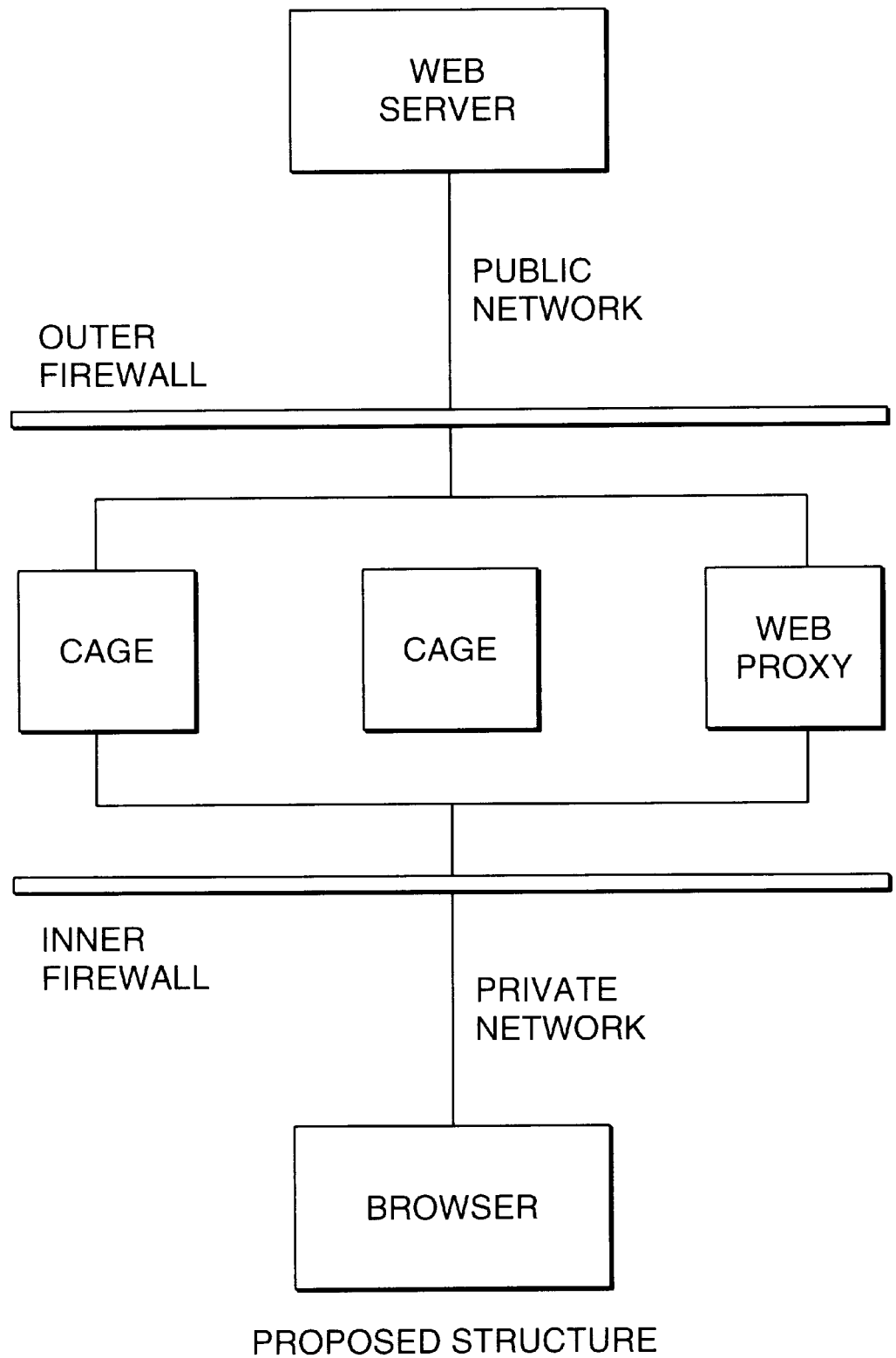
FIG. 3 is a block diagram of a computer network depicting the interconnection of an end user system to a public network, according to the invention.

In the method of the invention as shown in FIG. 3, data from the public network is not fed directly to the end user but is scanned and any program components within the data stream are diverted into an execution location, denoted as a cage. The scanning of the incoming data stream to identify program components in it and to divert those to and execute those in the cage can be done by any trusted component located in the path of the data stream, for example a local Web proxy, the browser program, a network router or a dedicated program. The execution cage is typically a conventional commercial computer interfaced between the end user system and the public network.

The execution cage thus acts as a protective screen between the public network and the private network of the end user and by virtue of the program under which it operates selectively and controlledly permits the transmission of data and/or program components which meet specified criteria, for example come from or are addressed to specified locations in the end user system or the external source.

In order to enhance the confidence of a user in the operation of the cage, it is preferred to provide firewalls at the interface between the cage and the end user system and between the cage and the public network. Either or both of these firewalls may be incorporated into the cage if desired. That portion of the overall system shown in FIG. 3 downstream of and including the outer firewall is located at the end user site. That portion downstream of and including the inner firewall is the end user system which is protected by the execution cage.

Figure 4:
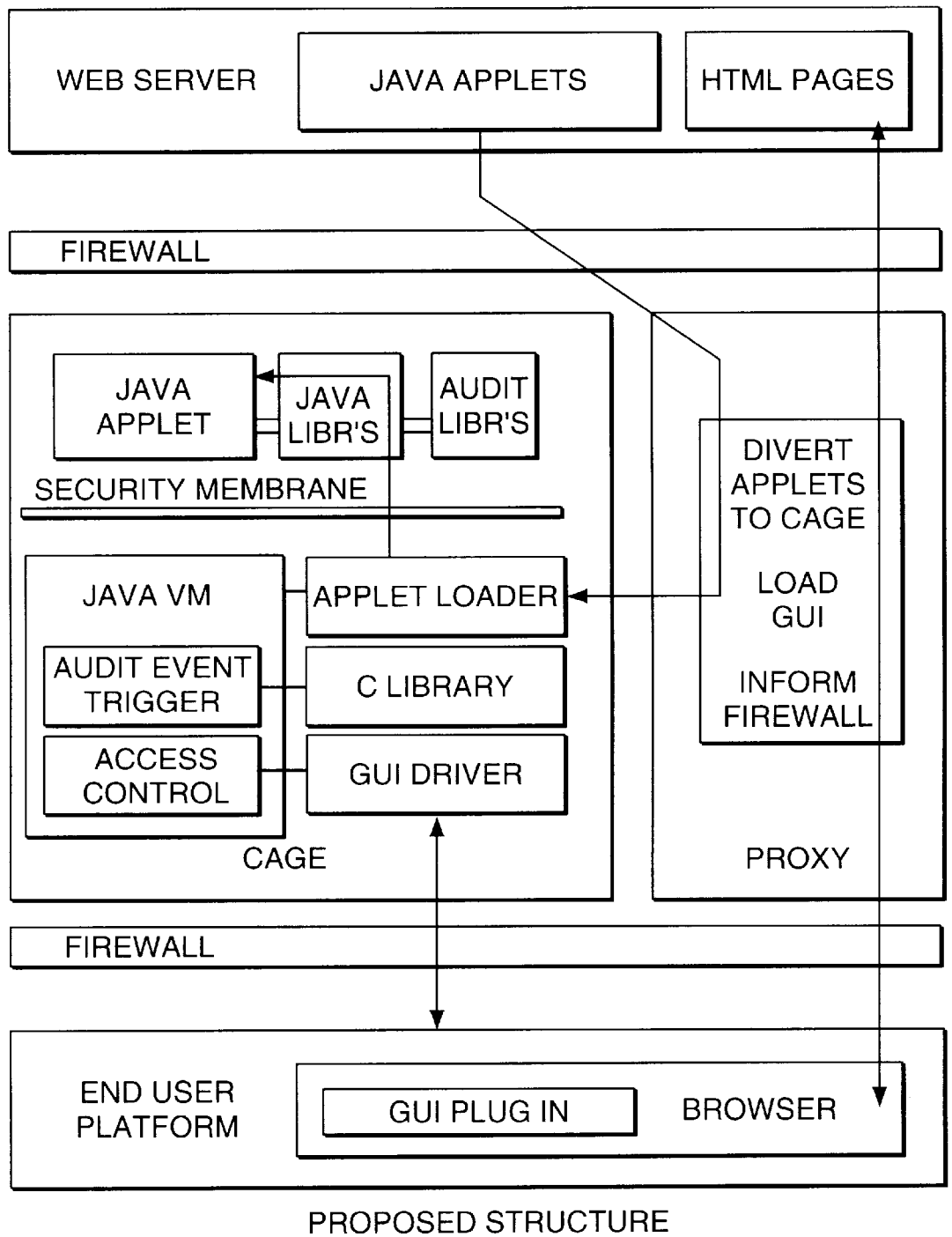
FIG. 4 is a block diagram of a computer network depicting transmission of the mobile program components across the computer network, according to the invention.

With reference to the system shown diagrammatically in FIG. 4, the Applets and other program components are executed within the cage. Data from the end user system and/or from the public network is interacted upon by the program components in the cage and the resultant modified data is transmitted to the end user system via a suitable interface. The interface is programmed to transmit data which satisfies specific access criteria but does not transmit or receive program components or data which does not satisfy the access requirements. Therefore, the cage retains the program components selectively isolated from or within the end user system and strictly regulates the data which is transmitted to and received by it. As a result, the end user system imports and exports only data which is acceptable. Since the program(s), in this case those operating the JAVA Virtual Machine, which control the operation of the cage can be small and readily inspected. The end user can thus verify the integrity of the program(s) to his satisfaction and can ascertain that the program is clearly and logically constructed and well documented by inspection of the program listing. Those components of the interface between the JAVA Virtual Machine and the public network which regulate the import of the JAVA Applets into the cage are also inspected to ensure the integrity of the operation of the cage.

Once within the cage, the Applet is executed under the control of the JAVA Virtual Machine so as to interact with data from the public network and/or the end user system in a controlled manner. In order to contain errant operation of the Applet and prevent it from gaining access to the end user system, some form of access control is provided either in the end user system or in the cage. Such access control can be in the form of an internal firewall. Access control can prevent the Applet from accessing any source or destination other than ones on a list provided by a system administrator or can require positive consent from the browser user before each access request is allowed to proceed. The program components within the cage can be classified into those components which must be inspected and verified in order to ensure the integrity of the cage, and those which can safely be imported and executed under the control of the former. The dividing line between these two sets of program components is known as a security membrane.

The necessary hardware for the cage can be of conventional nature and the operating program(s) can be prepared using conventional programming techniques and algorithms.

What is claimed is:

1. An end user computer system programmed to operate in response to an imported data stream containing at least one mobile program component from an external source, characterized in that:

a. the data stream is screened to identify mobile program components of that data stream;

b. at least one of the mobile program components is passed to at least one program execution location physically isolated by separate hardware within the end user system prior to being executed to operate in a desired manner;

c. the execution location is one in which at least one program component is retained and which has at least one interface with the external source of the data stream and at least one interface with the end user system whereby the program component within the execution location can be executed within the execution location to interact with one of the external source of data and the data and a program held by the end user system; and d. the operation of the interface between the execution location and the end user system is programmed so that only data which has been interacted on by the program component within the execution location in a specified and controlled manner and program components which operate in a specified manner can be passed to and from the end user system.

2. An end user computer system as claimed in claim 1, characterized in that the execution location is provided by a computer located intermediate the external source of the data stream and the end user system, which computer is isolated from the end user system and communicates with that end user system via at least one interface whose operation is controlled to permit the passage of at least one of data and program components in a selective and controlled manner.

3. An end user system as claimed in claim 2, characterized in that the execution location is programmed to operate with a single one of source of data and destination of data external to the end user system and to transmit and receive data to and from a single destination within the end user system.

4. An end user system as claimed in claim 1 which is provided with a plurality of execution locations, each programmed to operate with a different external data source and with a different destination within the end user system.

5. An end user system as claimed in claim 1, characterized in that the execution location is provided with at least one firewall between the execution location and one of the external source of data and the end user system.

6. An end user system as claimed in claim 1, characterized in that the execution location is provided with program means adapted to operate program components received from the external source in a specified manner and to permit transmission solely of one of data and program components which satisfy specific predetermined criteria to the end user system.

7. An end user system as claimed in claim 1, characterized in that the external data source operates under JAVA technology and the program components which are to be intercepted and run within the execution location are Applets.

8. An end user system as claimed in claim 1, characterized in that the end user system is a public access service provider.

9. An execution location for use in the apparatus of claim 1, characterized in that the execution location comprises a computer adapted to act as an interface between an external source of one of data and program components and an end user computer system which is to receive and transmit data to and from the computer, which computer is programmed to divert at least one of the program components from the external source to the computer and to execute those program components within the computer and to permit transfer of one of data and program components to the end user system which operate and have been operated on in selected and specified manners.

10. The end user computer system of claim 1 wherein the program execution location is physically isolated from the end user system.

11. A method for operating an end user computer system which comprises importing to the system a data stream containing at least one mobile program component which is to execute on the computer system from an external source, which method comprises:

a. screening the data stream to identify mobile program components of that data stream;

b. passing at least one mobile program component to at least one program execution location physically isolated by separate hardware within the end user system;

c. executing the mobile program component within the execution location so as to interact with data from one of the end user system and the external source;

d. passing one of the program components which operate in a specified manner and the interacted data and the resultant data from such interaction to the end user system via an interface which permits the transmission of one of data and program components which correspond to specified criteria to and from specified locations in one of the end user system and the external source.

12. The method of claim 11 wherein step (b) comprises:

b. passing at least one of the mobile program components to at least one of the program execution locations physically isolated from the end user system.

13. A program for operating a location for the execution of mobile program components in an incoming data stream imported to an end user computer system, of which at least one mobile program component is to be executed on the end user computer system, which program causes:

a. at least one of the incoming mobile program components to be directed to at least one execution location which is physically isolated by separate hardware within the end user system;

b. the mobile program component to be executed within the execution location so as to interact with data from one of the end user system and the external source; and c. one of program components which operate in a specified manner and data and the resultant data from such interaction to be passed to the end user system via an interface which permits the transmission of one of data and program components which correspond to specified criteria to and from specified locations in one of the end user system and the external source.

14. The method of claim 13 wherein step (a) comprises:

a. passing at least one of the mobile program components to at least one of the program execution locations physically isolated from the end user system.

* * * * *

UNITED STATES PATENT AND TRADEMARK OFFICE
CERTIFICATE OF CORRECTION

PATENT NO. : 6,065,118
DATED : May 16, 2000
INVENTOR(S) : Bull et al.

It is certified that error appears in the above-identified patent and that said Letters Patent is hereby corrected as shown below:

[75] Inventors: replace "both of" with --Andre Kramer, Cambridge, all from the--

Signed and Sealed this

Seventeenth Day of April, 2001

Attest:

NICHOLAS P. GODICI

Attesting Officer     Acting Director of the United States Patent and Trademark Office